United States Patent
Herda et al.

(10) Patent No.: US 12,085,028 B2
(45) Date of Patent: Sep. 10, 2024

(54) METHOD AND DEVICE FOR DETECTING A ROTATING STALL ADVERSELY AFFECTING A TURBOJET ENGINE COMPRESSOR

(71) Applicant: SAFRAN AIRCRAFT ENGINES, Paris (FR)

(72) Inventors: Soufiane Herda, Moissy-Cramayel (FR); Vincent Michel Cabret, Moissy-Cramayel (FR); Cedrik Djelassi, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 439 days.

(21) Appl. No.: 17/298,806

(22) PCT Filed: Nov. 29, 2019

(86) PCT No.: PCT/FR2019/052853
§ 371 (c)(1),
(2) Date: Jun. 1, 2021

(87) PCT Pub. No.: WO2020/115405
PCT Pub. Date: Jun. 11, 2020

(65) Prior Publication Data
US 2022/0056853 A1     Feb. 24, 2022

(30) Foreign Application Priority Data
Dec. 3, 2018 (FR) ..................... 18 72254

(51) Int. Cl.
*F02C 9/28* (2006.01)
*F02C 9/20* (2006.01)
(Continued)

(52) U.S. Cl.
CPC .................. *F02C 9/28* (2013.01); *F02C 9/20* (2013.01); *F04D 27/001* (2013.01);
(Continued)

(58) Field of Classification Search
CPC ...... F02C 9/28; F02C 9/20; F02C 9/00; F04D 27/001; F04D 27/0246; F04D 27/02;
(Continued)

(56) References Cited

U.S. PATENT DOCUMENTS 4,490,791 A * 12/1984 Morrison .................. F02C 9/28
340/965
4,581,888 A 4/1986 Schmitzer et al.
(Continued)

FOREIGN PATENT DOCUMENTS

FR 2 557 217 A1 6/1985
RU 2 354 851 C1 5/2009
WO WO 2012/004506 A1 1/2012

OTHER PUBLICATIONS

Combined Chinese Office Action and Search Report issued Dec. 27, 2022 in Chinese Patent Application No. 201980078649.6 (with English Translation), 12 pages.
(Continued)

*Primary Examiner* — James M McPherson
*Assistant Examiner* — Kyle J Kingsland
(74) *Attorney, Agent, or Firm* — Oblon, McClelland, Maier & Neustadt, L.L.P.

(57) ABSTRACT

A method for detecting a rotating stall includes: determining a level of variation of a static pressure in a combustion chamber of the turbojet engine around an average value of this static pressure; comparing the level of variation of the static pressure relative to a first threshold; comparing a temperature measured at the outlet of a turbine of the turbojet engine relative to a second threshold; and if the level of variation of the static pressure is greater than the first threshold and the temperature at the outlet of the turbine is greater than the second threshold, detecting a presence of a rotating stall.

11 Claims, 4 Drawing Sheets

(51) Int. Cl.
 *F04D 27/00* (2006.01)
 *F04D 27/02* (2006.01)
(52) U.S. Cl.
 CPC .... *F04D 27/0246* (2013.01); *F05D 2220/323* (2013.01); *F05D 2270/083* (2013.01); *F05D 2270/101* (2013.01); *F05D 2270/3011* (2013.01); *F05D 2270/303* (2013.01)
(58) Field of Classification Search
 CPC ......... F05D 2220/323; F05D 2270/083; F05D 2270/101; F05D 2270/3011; F05D 2270/303; Y02T 50/60
 See application file for complete search history.

(56) References Cited

U.S. PATENT DOCUMENTS

| | | |
|---|---|---|
| RE34,388 E | 9/1993 | Dubin et al. |
| 9,988,930 B2 | 6/2018 | Elysee |
| 2004/0193355 A1 | 9/2004 | Faymon et al. |
| 2013/0186191 A1 | 7/2013 | Djelassi |
| 2016/0025596 A1* | 1/2016 | Heda .................... G01M 15/14 73/112.06 |
| 2016/0130974 A1* | 5/2016 | Elysee ................... F01D 21/14 701/100 |

OTHER PUBLICATIONS

International Search Report issued Apr. 15, 2020 in PCT/FR2019/052853 filed Nov. 29, 2019, 2 pages.

Preliminary French Search Report issued Jul. 12, 2019 in French Patent Application No. 1872254 filed Dec. 3, 2018, 3 pages (with Translation of Category).

* cited by examiner

METHOD AND DEVICE FOR DETECTING A ROTATING STALL ADVERSELY AFFECTING A TURBOJET ENGINE COMPRESSOR

PRIOR ART

The present invention relates to the general field of aeronautical turbomachines. It relates more particularly to the detection of a rotating stall adversely affecting a compressor of a turbojet engine equipping an aircraft.

The invention applies in a favored but not limiting manner to turbojet engines equipping civil airplanes, and in particular those required to perform takeoffs in very cold weather, at temperatures typically lower than −20° C. The invention applies more particularly to turbojets engines with double spools (one low-pressure spool and one high-pressure spool) of relatively small size, such as those equipping business airplanes for example. In fact, the relatively small size of a turbojet engine with double spools constrains the size and/or the architecture of the high-pressure compressor. This generally induces differences in behavior at the high-pressure compressor, relative to a more voluminous engine such as those used for airliners in which the high-pressure compressor is necessarily of greater size. The risk of the appearance of a rotating stall in a compressor of a turbojet engine of relatively small size is thus comparatively greater than in a turbojet engine of larger size.

In known fashion, a rotating stall is an aerodynamic instability adversely affecting the compressor of a turbojet engine, and which is characterized by the presence of one or more localized pockets of fluid (called cells or separation bubbles), propagating in the circumferential direction of the compressor, at a speed generally less than the speed of rotation of the compressor.

This instability generally induces a weakening of the compression characteristics and is manifested in particular by a drop in efficiency in the compressor leading to overheating of the turbojet engine. When this overheating phenomenon appears when starting the turbojet engine, the start must be aborted and the result is an inability of the turbojet engine to start. In addition, the instability resulting from the presence of a rotating stall is responsible for considerable vibrational phenomena which can lead to premature wear of the blades of the compressor.

The importance of being able to rapidly and reliably detect the appearance of a rotating stall in the compressor of a turbojet engine will therefore be easily understood.

Document WO 2012/004506 describes one detection technique combining the monitoring of several behavior signatures associated with the rotating stall phenomenon. More specifically, a rotating stall adversely affecting the compressor of a turbojet engine is detected when it is determined that the temperature at the outlet of the turbine of the turbojet engine undergoes an increase greater than a predetermined threshold relative to a value that it had at a particular instant corresponding to the identification of an abnormal acceleration of the turbojet engine, and abnormal drop in its speed, or an abnormal operating line (pressure ratio between the pressure at the outlet of the combustion chamber of the turbojet engine and the total pressure at the inlet of the fan) of the compressor.

The invention proposes an alternative detection technique particularly well adapted to turbojet engines used in business aviation or for turbojet engines of equivalent size.

DISCLOSURE OF THE INVENTION

The invention concerns most particularly a method for detecting a rotating stall adversely affecting a compressor of a turbojet engine, this method comprising:

- a step of determining a level of variation of a static pressure in a combustion chamber of the turbojet engine around an average value of this static pressure;
- a step of comparing the level of variation of the static pressure relative to a first threshold;
- a step of comparing a temperature measured at the outlet of a turbine of the turbojet engine relative to a second threshold; and
- if the level of variation of the static pressure is greater than the first threshold and the temperature at the outlet of the turbine is greater than the second threshold, a step of detecting a presence of a rotating stall.

As a corollary, the invention also relates to a device for detecting a rotating stall adversely affecting a compressor of a turbojet engine, comprising:

- a determination module, configured to determine a level of variation of a static pressure in a combustion chamber of the turbojet engine around an average value of this static pressure;
- a first comparison module, configured to compare the level of variation of the static pressure relative to a first threshold;
- a second comparison module configured to compare a temperature measured at the outlet of a turbine of the turbojet engine relative to a second threshold; and
- a module for detecting a presence of a rotating stall, activated if the level of variation of the static pressure is greater than the first threshold and the temperature at the outlet of the low-pressure compressor is greater than the second threshold.

The invention therefore proposes a detection technique based on two behavior signatures of the rotating stall, namely the presence of "noise" in the static pressure at the combustion chamber of the turbojet engine and an abnormally high level of the temperature at the outlet of the low-pressure turbine for a double-spool turbojet engine, this temperature also being known as the EGT (exhaust gas temperature) temperature.

What is meant here by noise is that the static pressure undergoes perturbations or abnormal variations (i.e. greater than a given threshold) around its average value, also designated here by nominal value. This average value can be determined for example by applying a high-frequency filter to the measurement signal of the static pressure in the combustion chamber.

Such variations are symptomatic of an instability in the compressor of the turbojet engine. The inventors have observed that this behavior signature, combined with excessive EGT temperature, are particularly relevant for reliably detecting the presence of a rotation stall in a turbojet engine of the size of those used in business aviation. By means of this reliable detection, the invention offers the possibility of reactively and effectively triggering techniques for accommodating a rotating stall of this type. Such techniques are known per se and are not described here.

In one particular embodiment, the determination step comprises:

- an evaluation step, for a plurality of samples of a measurement signal of the static pressure in the combustion chamber, of a difference between the value of the static pressure for these samples and the average value of the static pressure;
- for each pair of successive samples of the plurality of samples comprising a first and a second sample:
  - a step of calculating a deviation between the difference evaluated for the first sample and the difference evaluated for the second sample;

a step of updating a counter depending on the deviation that was determined, this counter representing the level of variation of the static pressure relative to its average value.

As a corollary, in this embodiment, the determination module of the detection device according to the invention comprises:

an evaluation module, configured to evaluate, for a plurality of samples of a measurement signal of the static pressure in the combustion chamber, a difference between the value of the static pressure for said samples and the average value of the static pressure;

a calculation module and an updating module, activated for each pair of successive samples of the plurality of samples comprising a first and a second sample:

the calculation module being configured to calculate a deviation between the difference evaluated for the first sample and the difference evaluated for the second sample; and the updating module being configured to update a counter depending on the deviation that was determined, this counter representing the level of variation of the static pressure relative to its average value.

This particular embodiment proposes to evaluate the level of variation of the static pressure of the combustion chamber based on the principle of the chord length of a signal, here namely on the chord length of the measurement signal of this static pressure. This principle is founded on the following observation: a signal departing from an initial state reaches a final state by traversing a path of a given length. This distance traveled on this path, compared to the nominal (average) distance travelled to attain the final state, allows knowing whether the signal has traveled a greater distance than that predicted and therefore if its path has been perturbed relative to the normal. A perturbed path corresponds to a signal which has undergone variations, i.e. perturbation, relative to its nominal value, and which is qualified here as noisy relative to this nominal value. As mentioned previously, a signal of this type is symptomatic of an instability in the high-pressure compressor of the turbojet engine and represents per se a behavior signature of a separation adversely affecting the compressor.

The average value of the static pressure is used to determine whether the pressure signal is noisy. The evaluation of the deviation at this average value allows determining the unsteady nature of the noise. If the variation over time between the deviations associated with the two successive samples of the signal is great, that signifies that there is a strong variation of the signal around its average value. The updating of a counter depending on the variation over time observed between several successive samples of the pressure signal allows quantifying the level of variation of the pressure signal around its nominal value and to detect whether the level of variation reflects, or not, an abnormal behavior of the turbojet engine. When the counter reaches a certain threshold, an indicator reflecting the potential presence of a rotating stall is activated; this indicator pitted against the EGT temperature allows deducing whether a rotating stall is in fact present or not in the turbojet engine.

In one particular embodiment, the updating step comprises:

decrementation of the counter if the deviation that was determined is less than or equal to a third threshold; and incrementation of the counter if the deviation that was determined is greater than the third threshold.

This embodiment allows accommodating the presence of "natural" noise linked in particular to the acquisition of a measurement signal of the pressure, to its digital processing (ex. numerical errors in filtering the pressure signal to determine its nominal value), etc.

For example, during an incrementation of the counter, the counter is incremented by a value which is an increasing function of the deviation that was determined, and/or during a decrementation of the counter, the counter is decremented by a value less than the values used for incrementing the counter during incrementations of the counter.

This allows retaining in memory (i.e. in the current value of the counter) the fact that a substantial variation of the static pressure relative to its average value has been encountered, and to maintain the active monitoring of the counter.

In one particular embodiment, the detection method also comprises:

a step of detecting a variation of a position of a variable geometry of the turbojet engine able to cause a variation of the static pressure in the combustion chamber; and a step of suspending the step of updating the counter as long as said variation of the position of the variable geometry is detected.

This embodiment allows taking events into account, such as variations of position of variable geometries of the turbojet engine, which can have an influence on the static pressure in the combustion chamber of the turbojet engine and cause sometimes substantial variations of it. These variations being normal, they are not taken into account in this embodiment for estimating the level of variation of the static pressure, in order to avoid undue detection of a rotating stall. The robustness of the detection method according to the invention is thus improved.

It is noted that as a variant, other events can trigger a suspension of the updating of the counter representing the level of variation of the static pressure around its average value.

In one particular embodiment, following the detection of the presence of a rotating stall, the method comprises:

a step of treating the rotating stall; and following the treatment step, a step of reinitializing the counter.

This allows reinitializing the monitoring of the turbojet engine and taking into account the intervention operated on the turbojet engine to dispose of the rotating stall.

In one particular embodiment, the step of determining the level of variation of the static pressure and the steps of comparison are implemented following the detection of an ignition of the turbojet engine and of an actual authorization to inject fuel into the turbojet engine.

This allows optimizing the monitoring and to limit it to situations where a rotating stall can in fact have been encountered in the turbojet engine.

In one particular embodiment, the different steps of the detection method are determined by instructions in computer programs.

Consequently, the invention also concerns a computer program on a storage medium, this program being able to be implemented in a detection device or more generally in a computer, this program including instructions suited to the implementation of the steps of a detection method as described above.

This program can use any programming language, and be in the form of a source code, object code, or intermediate code between a source code and an object code, such as in a partially compiled form, or in any other desirable form.

The invention also concerns a storage medium readable by a computer, and including instructions of a computer program as mentioned above.

The information support can be any entity or device capable of storing the program. For example, the support can include a storage medium such as a ROM, for example a CD ROM or a ROM of a microelectronic circuit, or even a magnetic recording medium, for example a hard disk.

On the other hand, the storage medium can be a transmissible medium such as an electrical or optical signal, which can be routed via an electrical or optical cable, by radio or by other means. The program according to the invention can in particular be uploaded on a network of the Internet type.

Alternatively, the information support can be an integrated circuit into which the program is incorporated, the circuit being suited to execute or to be used in the execution of the method in question.

The invention also concerns a turbojet engine comprising a detection device according to the invention.

The turbojet engine has the benefit of the same advantages previously mentioned as detection method and device according to the invention.

BRIEF DESCRIPTION OF THE DRAWINGS

Other features and advantages of the present invention will be revealed by the description given below, with reference to the appended drawings which illustrate one exemplary embodiment lacking any limiting character. In the figures.

DESCRIPTION OF THE EMBODIMENTS

As previously mentioned, the invention advantageously proposed to combine several indicators or behavior signatures of the turbojet engine associated with the rotating stall phenomenon, in order to reliably identify its presence in a compressor of the turbojet engine. What is meant here by behavior signature is a behavior characteristic of an operating parameter of the turbojet engine (for ex. static pressure in the combustion chamber of the turbojet engine, temperature at the outlet of a turbine of the turbojet engine, etc.), in the presence of a rotating stall.

Figure 1:
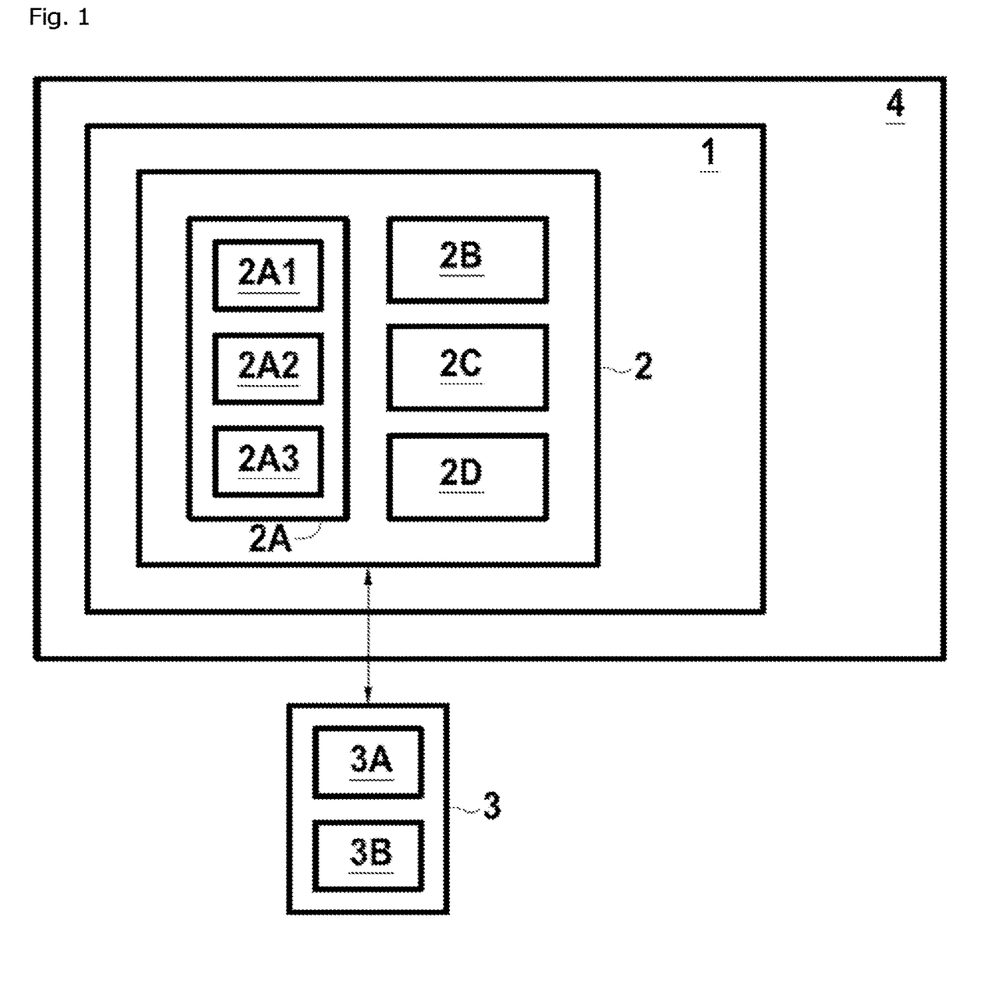
FIG. 1 shows, in its environment, a turbojet engine conforming to the invention and comprising a device for detecting a rotation stall according to the invention.

With reference to FIG. 1, here what is particularly interesting is a double spool turbojet engine 1 equipping a business airplane and comprising a detection device 2, conforming to the invention. The turbojet engine 1 includes in particular, in known fashion, a fan, an axial low-pressure compressor, an axial high-pressure compressor, a combustion chamber, a high-pressure turbine and a low-pressure turbine (not shown in FIG. 1), as well as sensors 3 allowing measuring various operating parameters of the turbojet engine 1, such as the static pressure in the combustion chamber (hereafter designated PS in the description) for example, or the temperature at the outlet of the low-pressure turbine (hereafter designated by temperature T in the description).

In the embodiment described here, the static pressure PS in the combustion chamber is measured by means of a sensor 3A positioned at the inlet of the combustion chamber, and the temperature T is measured by means of a sensor 3B placed at the outlet of the low-pressure turbine of the turbojet engine 1.

A turbojet engine of this type is for example a double spool turbojet engine of relatively small size, such as in particular those equipping business airplanes. The invention applies, however, to other turbojet engines suited to such a context having a risk of the appearance of a rotating stall in a compressor.

In conformity with the invention, the detection device 2 considers, for detecting the presence of a rotating stall adversely affecting the turbojet engine 1, the following two indicators:
- a noisy (beyond a certain threshold) static pressure PS in the combustion chamber of the turbojet engine 1; and
- an excessive temperature T at the outlet of the low-pressure turbine of the turbojet engine 1.

The existence of these indicators allow predicting the presence of a rotating stall adversely affecting a compressor of the turbojet 1, such as for example the high-pressure compressor. Of course, other indicators in addition to these can be considered to further reinforce the reliability of the detection and to avoid false alarms in particular.

In the embodiment described here, the detection device 2 is integrated into the calculator 4 of the turbojet engine 1. A calculator of this type is known per se and is not described in detail here; it can for example be a full-authority control device of the airplane propelled by the turbojet engine 1, also known under the name FADEC (Full Authority Digital Engine Control)

Figure 2:
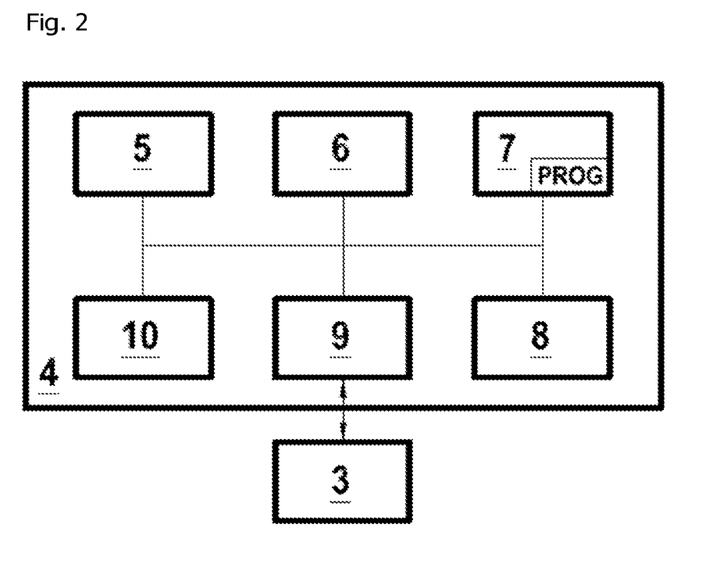
FIG. 2 shows schematically the material architecture of a calculator of the turbojet engine integrating the detection device according to the invention, in a particular embodiment.

The detection device 2 relies on the material elements of the calculator 4 which has the material architecture of a computer shown schematically in FIG. 2. The calculator 4 comprises in particular a processor 5, a random access memory 6, a read-only memory 7 a nonvolatile flash memory 8, communication means 9 allowing it in particular to communicate with the different sensors 3 carried aboard the airplane equipped with the turbojet engine 1 (and in particular with the pressure and temperature sensors 3A and 3B) as well as input/output means 10 allowing the detection device 2 to signal the presence of a rotating stall in the turbojet engine 1, so as for example to trigger a maintenance operation allowing it to be accommodated.

In the embodiment described here, the read-only memory 7 of the detection device 2 constitutes a storage medium conforming to the invention, readable by the processor 5 and on which is recorded a computer program PROG conforming to the invention, including instructions for the execution of a portion of the steps of the detection method according to the invention.

The computer program PROG defined functional (and software here) modules of the detection device 2 which use or rely in particular on the material elements 5-10 of the calculator 4 previously mentioned. Here these modules comprise in particular, as illustrated in FIG. 1:

a determination module 2A, configured for determining a level of variation of the static pressure PS in the combustion chamber of the turbojet engine 1 around its average value. In the embodiment described here, the determination module 2A itself comprises several (sub-) modules allowing it to determine the level of variation of the static pressure PS, namely an evaluation module 2A1, a calculation module 2A2 and an updating module 2A3, of which the respective functions are further detailed hereafter;

a first comparison module 2B, configured to compare this level of variation of the static pressure relative to a first threshold referred to as THR1;

a second comparison module 2C, configured to compare the temperature T measured at the output of the low-pressure turbine of the turbojet engine 1 relative to a second threshold denoted THR2; and a module 2D for detecting the presence of a rotating stall, activated if the level of variation of the static pressure PS is greater than the threshold THR1 and the temperature T at the output of the low-pressure turbine is greater than the threshold THR2.

The modules 2A to 2D are now described in more detail with reference to the steps of the detection method according to the invention.

Figure 3:
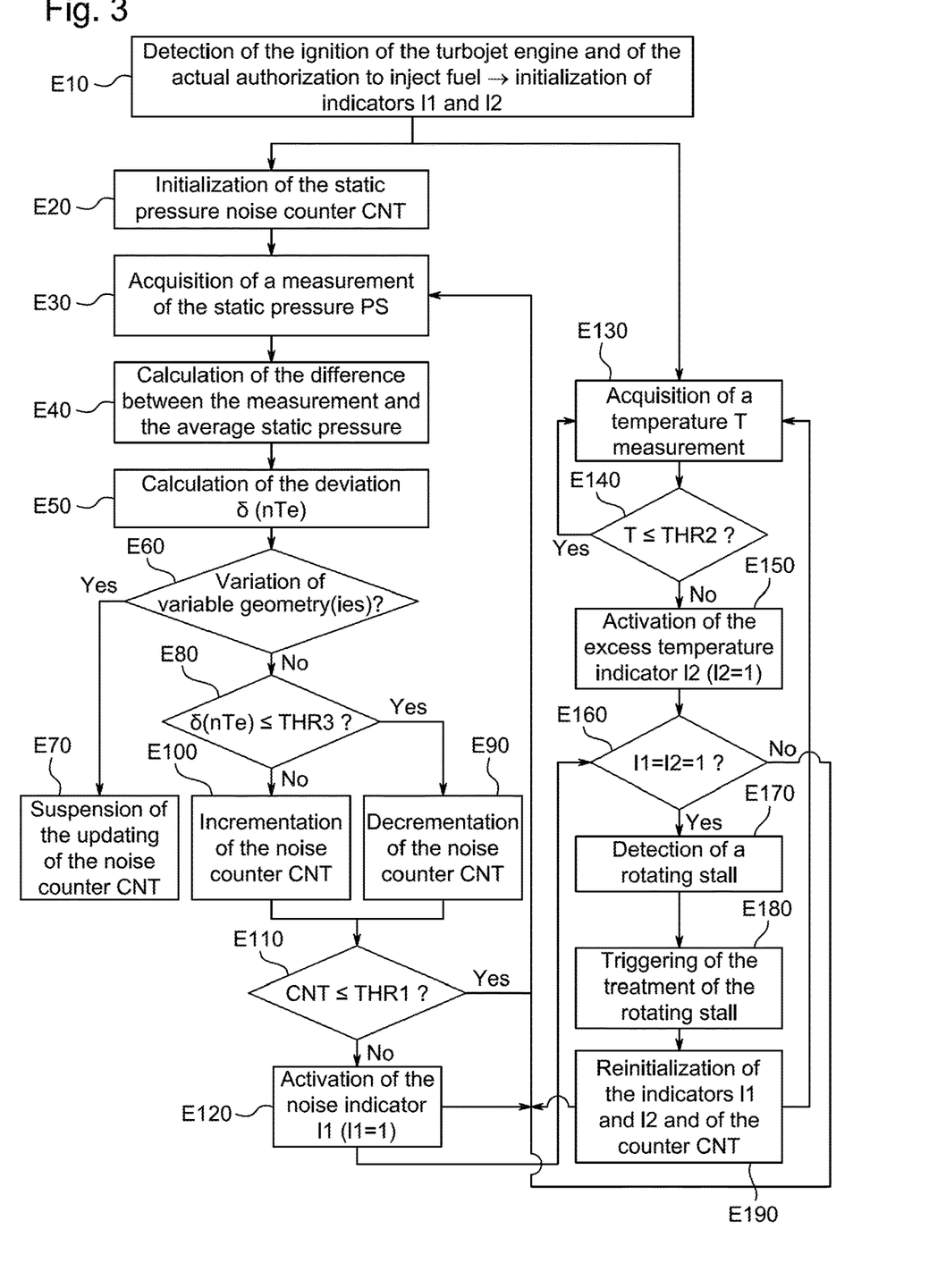
FIG. 3 shows the main steps of a detection method according to the invention as they are implemented by the detection device of FIG. 1.

FIG. 3 shows, in the form of a flowchart, the main steps of the detection method according to the invention, in a particular embodiment in which these steps are implemented by the detection device 2 equipping the turbojet engine 1.

In the example described here, the detection of a rotating stall adversely affecting the high-pressure compressor of the turbojet engine 1 is considered. This assumption, however, is not limiting; the invention also being applicable to the low-pressure compressor of the turbojet engine 1.

In known fashion, a turbojet engine is likely to encounter a rotating stall situation during two distinct operating phases of the turbojet engine, namely:

during a starting or restarting phase of the turbojet engine (turbojet engine in "sub-idle" operation); and/or during a thrust regulation phase following starting (turbojet engine in "off-idle" operation).

In conformity with the embodiment described here, to preserve the resources of the airplane and of the calculator 4, the detection method according to the invention is implemented by the detection device 2 only when ignition of the turbojet engine 1 and an actual authorization to inject fuel into the turbojet engine 1 have been detected (step E10). These two events can easily be detected by analyzing the starting commands of the turbojet engine 1, which indicate whether it is in a starting/restarting phase, as well as the fuel injection set-points supplied in particular by the calculator 4.

As a variant, in another embodiment, the detection method can be implemented only when it is detected that the turbojet engine 1 is in one or the other of the two aforementioned phases, this in order to further preserve the resources of the airplane and of the calculator 4.

Following this detection, the detection device 2 triggers the monitoring of the static pressure PS in the combustion chamber of the turbojet engine 1 and of the temperature T at the outlet of the low-pressure turbine of the turbojet engine 1, in conformity with the invention.

To monitor the static pressure PS in the combustion chamber of the turbojet engine 1, and more precisely the level of variation of the static pressure around its average value, the detection device 2 uses, in the embodiment described here, a counter CNT also designated as a "noise counter." This noise counter CNT is incremented and decremented so as to be representative of the level of variation of the static pressure PS. It is initialized to zero following the detection of the ignition of the turbojet engine 1 and the actual authorization to inject fuel into the turbojet engine 1 (step E20). Other events that can cause a reinitialization of the counter CNT are described in more detail hereafter.

For each measurement denoted PS(t=nTe) acquired at an instant t=nTe by the static pressure PS sensor 3A in the combustion chamber (step E30), where Te designates the period of acquisition of the sensor 3A and n an integer greater than or equal to 0, the determination module 2A of the detection device 2 evaluated, by means of its evaluation module 2A1, the difference denoted ΔPS(nTe) between the value PS(nTe) of the static pressure PS given by the measurement and the average (nominal) value PSnom(nTe) of the static pressure PS evaluated at that instant (step E40), or:

ΔPS(nTe)=PS(nTe)−(PSnom(nTe)).

It is noted that each measurement acquired by the sensor 3A constitutes a sample at the instant nTe of the time-lapse measurement signal PS(t) of the static pressure within the meaning of the invention, t designating time.

In the embodiment described here, the nominal or average value PSnom(nTe) of the static pressure at the instant nTe is obtained by filtering the measurement signal PS(t) delivered by the pressure sensor 3A by means of a low-pass filter. This filtration allows eliminating the variations of the pressure in the measurement signal (by removing its high-frequency components), "de-noising" in other words the signal acquired by the measurement sensor 3A. The parameters of the low-pass filter (gain, order, delay(s), etc.) are selected so as to filter the useful signal: their determination would not pose any difficulty for a person skilled in the art and is not described here.

The difference ΔPS(nTe) is stored here by the determination module 2A in its nonvolatile memory in association with the sampling instant nTe.

Then the determination module 2A, by means of its calculation module 2A2, calculates the deviation denoted δ(nTe) between the difference ΔPS(nTe) calculated for the instant nTe and the difference ΔPS((n−1)Te) calculated for the measurement of the static pressure acquired at the preceding instant (n−1)Te (step E50). In the embodiment described here, the deviation δ(nTe) is calculated by the calculation module 2A2 based on the following relation:

δ(nTe)=|ΔPS(nTe)−ΔPS((n−1)Te)| where || designates the absolute value. The deviation δ(nTe) thus calculated corresponds to the length of the measurement signal PS(t) of the static pressure between the samples at the instants nTe and (n−1)Te.

In the embodiment described here, the determination module 2A then determines if predetermined events able to cause variations of the static pressure PS(nTe) of the combustion chamber around its average value are taking place (test step E60). One such event is for example the variation of the position of one or more variable geometries of the turbojet engine 1. A variable geometry of a turbojet engine is a movable member, the position of which can be controlled to act on the circulation of a fluid in the turbojet engine, for example a fluid such as the gas flow in the primary stream, in order to control the behavior of the turbojet engine. The variable geometries can be valves, such as for example air discharge valves also commonly designated by VBV (for Variable Bleed Valve) or by HBV (for Handling Bleed Valve) depending on their function relative to a low-pressure compressor or a high-pressure compressor of a double spool turbojet engine. If the determination module 2A detects an event of this type on board the turbojet engine 1, (yes response in test step E60), then no updating of the noise counter CNT is undertaken as long as the event is detected (step E70). In other words, the updating of the noise counter CNT is suspended during the entire period where a variation of the position of the variable geometry is carried out.

Otherwise, (no response in test step E60), the determination module 2A compares, by means of its updating module 2A3, the calculated deviation δ(nTe) with different thresholds to determined how to update the counter CNT depending on this deviation.

Figure 4A:
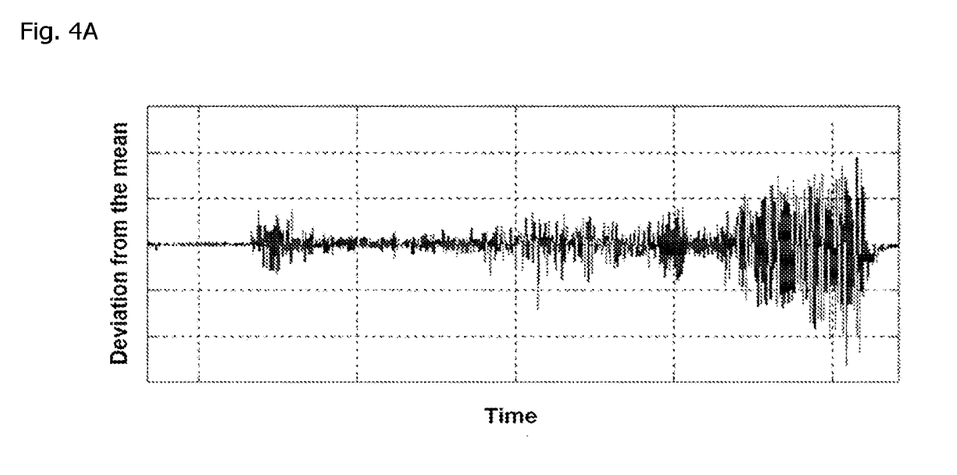
FIG. 4A illustrates the variations of the deviations of the static pressure relative to its nominal value in a specific case.

More precisely, it first determines whether the deviation δ(nTe) is representative of a noise due to an instability of the high-pressure compressor of the turbojet engine 1 or if it is due more to perturbations or errors corresponding to other phenomena which are not strictly speaking linked to abnormal operation of the compressor or of the turbojet engine (and the more so to a rotating stall), such as for example acquisition noise of the measurement signal or to noise originating from numerical errors induced by the filtering of the measurement signal carried out to determine the nominal value of the static pressure, etc. The inventors have noted that these perturbations naturally induce smaller deviations between the samples of the measurement signal relative to deviations noted in the presence of an instability of the compressor and possibly of a rotating stall. FIG. 4A illustrates an example of variations of the deviations of the static pressure relative to its average value in the case of the presence of a rotating stall. In other words, a smaller variation is noted from one sample to another of the variations of the static pressure around its average value. To take this behavior into account, and thus determine whether the deviation δ(nTe) is representative of a noise due to an instability of the high-pressure compressor of the turbojet engine 1, the updating module 2A3 compares the deviation δ(nTe) with a threshold THR3 (third threshold within the meaning of the invention), this being easily determined experimentally (test step E80).

Figure 4B:
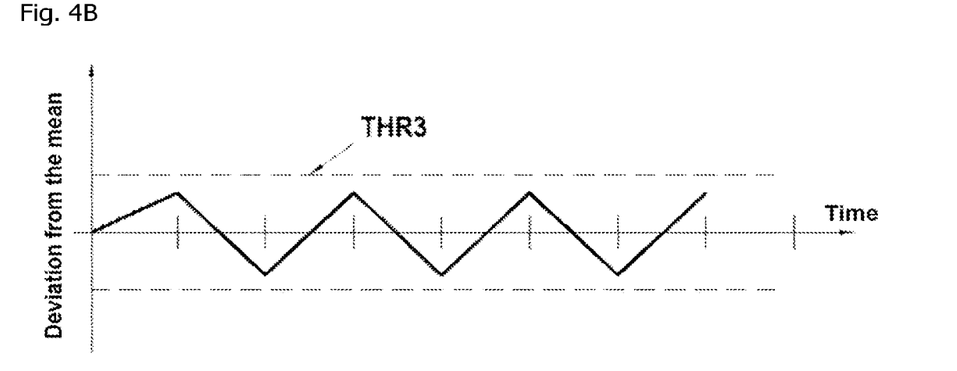
FIG. 4B FIG. 4B illustrates the variations of the deviations of the static pressure relative to its nominal value in another specific case; and FIG. 4C

If the deviation δ(nTe) is less than or equal to the threshold THR3 (no response in test step E80, see also FIG. 4B illustrating this specific case), then the updating module 2A3 considers that this deviation is not due to an instability of the compressor nor, the more so, to a rotating stall: in this case, the updating module 2A3 decrements the noise counter CNT (step E90).

Figure 4C:
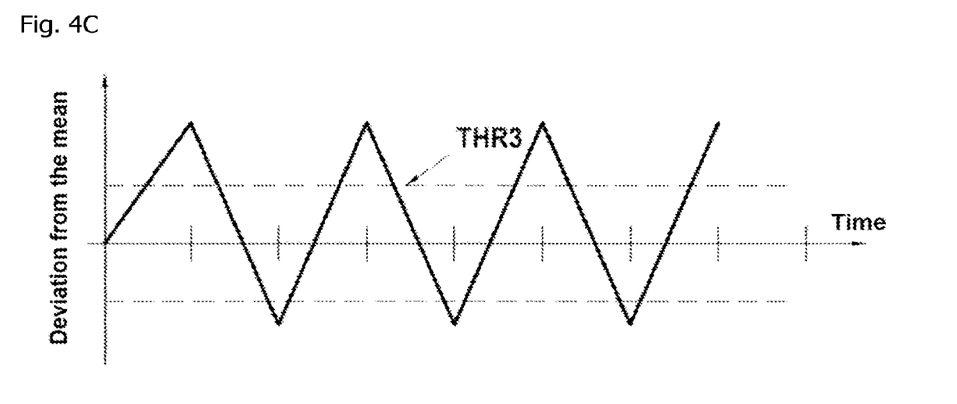
FIG. 4C illustrates the variations of the deviations of the static pressure relative to its nominal value in another specific case.

If on the other hand the deviation δ(nTe) is greater than the threshold THR3 (yes response in test step E60, see also FIG. 4C illustrating this specific case), then the updating module 2A3 considers that this deviation is due to an instability of the compressor, and potentially to a rotating stall: in this case, the updating module 2A3 increments the noise counter CNT (step E100).

In the embodiment described here, the value used for incrementing the noise counter CNT in step E100 depends on the value of the deviation δ(nTe). Here more particularly, this value varies linearly as a function of the deviation δ(nTe) along an increase function of it. In addition, the value used for possibly decrementing the counter CNT during step E90 is selected to be less than the values used for incrementing the counter CNT. In this manner, it is ensured that the value of the noise counter CNT will retain a trace of a large variation of the static pressure PS.

It is noted, moreover, that to avoid the noise counter CNT taking on abnormal values, it is possible to envisage forcing it not to be less than a minimum value (0 for example) and not to exceed a maximum value (100 for example). In other words, if during incrementations and decrementations the value of the counter becomes negative, it is constrained to 0, and if it exceeds the defined maximum (for ex. 100), it is constrained to that maximum value.

The noise counter CNT kept up to date by the updating module 2A3 reflects the level of variation of static pressure PS in the combustion chamber of the turbojet engine 1 relative to its average value. It is compared by the first comparison module 2B of the detection device 2 to a threshold THR1 (first threshold within the meaning of the invention) to determine if this level of variation is acceptable or on the contrary is symptomatic of an instability of the high-pressure compressor of the turbojet engine 1 (test step E110). The threshold THR1 can be easily determined experimentally. It is selected sufficiently large to avoid any risk of false detection.

If the noise counter CNT is less than or equal to the threshold THR1 (yes response in test step E110), the steps E30 to E110 are repeated with a new measurement of the static pressure PS acquired by the sensor 3A.

If the first comparison module 2B determines that the noise counter CNT is greater than the threshold THR1 (no response in test step E120), then it activates an indicator I1 call the static pressure noise indicator, indicating that an instability of the high-pressure compressor of the turbojet engine 1 is suspected (step E120). In the embodiment described here, this activation consists of positioning the indicator I1 to the value 1.

Steps E30 to E120 are then repeated with new measurements of the static pressure PS acquired by the sensor 3A.

As previously mentioned, the invention relies on the monitoring of several behavior signatures of a rotating stall. Thus, besides the variations of static pressure in the combustion chamber of the turbojet engine 1, the detection device 2 also monitors, in the embodiment described here, the temperature T at the outlet of the low-pressure turbine of the turbojet engine 1. An excessive temperature T, combined with a level of variation of the static pressure PS around its average greater than the threshold THR1 triggers the detection of a rotating stall.

In parallel with steps E20 to E120 of monitoring the level of variation of the static pressure PS, the detection device 2, by means of its second comparison module 2C, compares each measurement of the temperature T acquired by the temperature sensor 3B (step E130), for example at instant nTe, relative to a predetermined threshold THR2 (second threshold within the meaning of the invention) (test step E140). The threshold THR2 is fixed so as to detect an excessive temperature at the outlet of the low-pressure turbine of the turbojet engine 1, symptomatic of a malfunction of the compressor and likely to originate in an overheating phenomenon of the turbojet engine 1 due to the presence of a rotating stall. This threshold THR2 can be determined experimentally. It is selected sufficiently large to avoid any risk of false detection.

If the temperature T(nTe) is less than or equal to the threshold THR2 (yes response in test step E140), no action is undertaken and a new measurement is considered.

On the other hand, if the temperature T(nTe) is greater than the threshold THR2 (no response in test step E140), an excessive temperature indicator denoted I2 is activated (step E150). In the embodiment described here, this activation consists of positioning the indicator I2 to the value 1.

In the embodiment described here, the detection module 2D of the detection device 2 is configured to determine whether the two indicators I1 and I2 are activated simultaneously (test step E160), in other words, to detect whether, at a given instant, the two indicators I1 and I2 are both positioned to the value 1.

In the contrary case, (no response in test step E160), the detection device 2 continues its monitoring of the temperature at the outlet of the low-pressure turbine and of variations of static pressure in the combustion chamber.

If the detection module 2D determines that the two indicators I1 and I2 are activated (yes response in test step E160), then it detects the presence of a rotating stall adversely affecting the high-pressure compressor of the turbojet engine 1 (step E170) and notifies it for example via its input/output means 10 in order to trigger an operation for treating this rotating stall (step E180). Such a treatment is known per se and is not described in detail here.

Following the treatment of the rotating stall, the indicators I1 and I2 are reinitialized to zero, like the noise counter CNT (step E190).

The invention claimed is:

1. A method for detecting a rotating stall adversely affecting a compressor of a turbojet engine, comprising:
   determining a level of variation of a static pressure in a combustion chamber of the turbojet engine around an average value of said static pressure;
   comparing the level of variation of the static pressure relative to a first threshold;
   comparing a temperature measured at an outlet of a turbine of the turbojet engine relative to a second threshold; and
   when the level of variation of the static pressure is greater than the first threshold and when the temperature at the outlet of the turbine is greater than the second threshold, detecting a presence of a rotating stall,
   wherein the determining the level of variation of the static pressure comprises:
   evaluating, for a plurality of samples of a measurement signal of the static pressure in the combustion chamber, a difference between the value of the static pressure for said samples and the average value of the static pressure, and
   for each pair of successive samples of said plurality of samples comprising a first and a second sample:
      calculating a deviation between the difference evaluated for the first sample and the difference evaluated for the second sample, and
      determining the level of variation of the static pressure relative of the average value of the static pressure based on the calculated deviation.

2. A detection method according to claim 1, wherein the determining the level of variation of the static pressure in the combustion chamber comprises:
   updating a counter depending on the calculated deviation, said counter representing the level of variation of the static pressure relative to the average value of the static pressure.

3. The detection method according to claim 2, wherein the updating the counter comprises:
   decrementation of the counter when the deviation that was determined is less than or equal to a third threshold; and
   incrementation of the counter when the deviation that was determined is greater than the third threshold.

4. The detection method according to claim 3, wherein during an incrementation of the counter, the counter is incremented by a value which is an increasing function of the calculated.

5. The detection method according to claim 3, wherein during a decrementation of the counter, the counter is decremented by a value less than values used for incrementing the counter during incrementations of the counter.

6. The detection method according to claim 2, further comprising:
   detecting a variation of a position of a variable geometry of the turbojet engine able to cause a variation of the static pressure in the combustion chamber;
   suspending the updating the counter as long as said variation of the position of the variable geometry is detected.

7. The detection method according to claim 2, further comprising, following the detecting of the presence of a rotating stall:
   treating said rotating stall; and
   following the treating said rotating stall, reinitializing the counter.

8. The detection method according to claim 1, wherein the determining the level of variation of the static pressure, the comparing the level of variation of the static pressure, and the comparing the temperature at the outlet of the turbine are implemented following detecting an ignition of the turbojet engine and detecting an actual authorization to inject fuel into the turbojet engine.

9. A device for detecting a rotating stall adversely affecting a compressor of a turbojet engine, comprising:
   a processor configured to
   determine a level of variation of a static pressure in a combustion chamber of the turbojet engine around an average value of said static pressure;
   configured to compare the level of variation of the static pressure relative to a first threshold;
   compare a temperature measured at an outlet of a turbine of the turbojet engine relative to a second threshold; and
   detect a presence of a rotating stall when the level of variation of the static pressure is greater than the first threshold and when the temperature at the outlet of the turbine of the turbojet engine is greater than the second threshold,
   wherein to determine the level of variation of the static pressure, the processor is further configured to:
   evaluate, for a plurality of samples of a measurement signal of the static pressure in the combustion chamber, a difference between the value of the static pressure for said samples and the average value of the static pressure, and
   for each pair of successive samples of said plurality of samples comprising a first and a second sample:
      calculate a deviation between the difference evaluated for the first sample and the difference evaluated for the second sample, and
      determine the level of variation of the static pressure relative of the average value of the static pressure based on the calculated deviation.

10. The detection device according to claim 9, wherein to determine the level of variation of the static pressure, the processor is further configured to:
   update a counter depending on the calculated deviation that was determined, said counter representing the level of variation of the static pressure relative to the average value of the static pressure.

11. A turbojet engine comprising the detection device according to claim 9.

* * * * *